L. E. BOOTH.
LINING FOR BRAKES AND CLUTCHES.
APPLICATION FILED APR. 3, 1920.

1,406,720.

Patented Feb. 14, 1922.

INVENTOR:
L. E. BOOTH
By
Earl M. Sinclair
Atty.

UNITED STATES PATENT OFFICE.

LEMEUL E. BOOTH, OF DES MOINES, IOWA, ASSIGNOR OF ONE-HALF TO GEORGE W. JOHN, OF DES MOINES, IOWA.

LINING FOR BRAKES AND CLUTCHES.

1,406,720.  Specification of Letters Patent.  Patented Feb. 14, 1922.

Application filed April 3, 1920. Serial No. 370,921.

*To all whom it may concern:*

Be it known that I, LEMEUL E. BOOTH, a citizen of the United States of America, and resident of Des Moines, Polk County, Iowa, have invented a new and useful Lining for Brakes and Clutches, of which the following is a specification.

The object of this invention is to provide an improved friction lining for clutch and brake bands and the like.

A further object of this invention is to provide a clutch or brake lining which insures a sure, positive and even frictional engagement with a driven member such as a clutch or brake drum.

A further object of this invention is to provide a clutch or brake lining possessing characteristics of a vacuum gripping device in use whereby a positive and very effective engagement with a driven member is insured.

A further object of this invention is to provide a device of the character described which is extremely durable and lasting, and which will not burn out so long as it is properly lubricated, even under the most severe usage.

My invention consists in the construction, arrangement and combination of elements hereinafter set forth, pointed out in my claims and illustrated by the accompanying drawing, in which—

Figure 1:
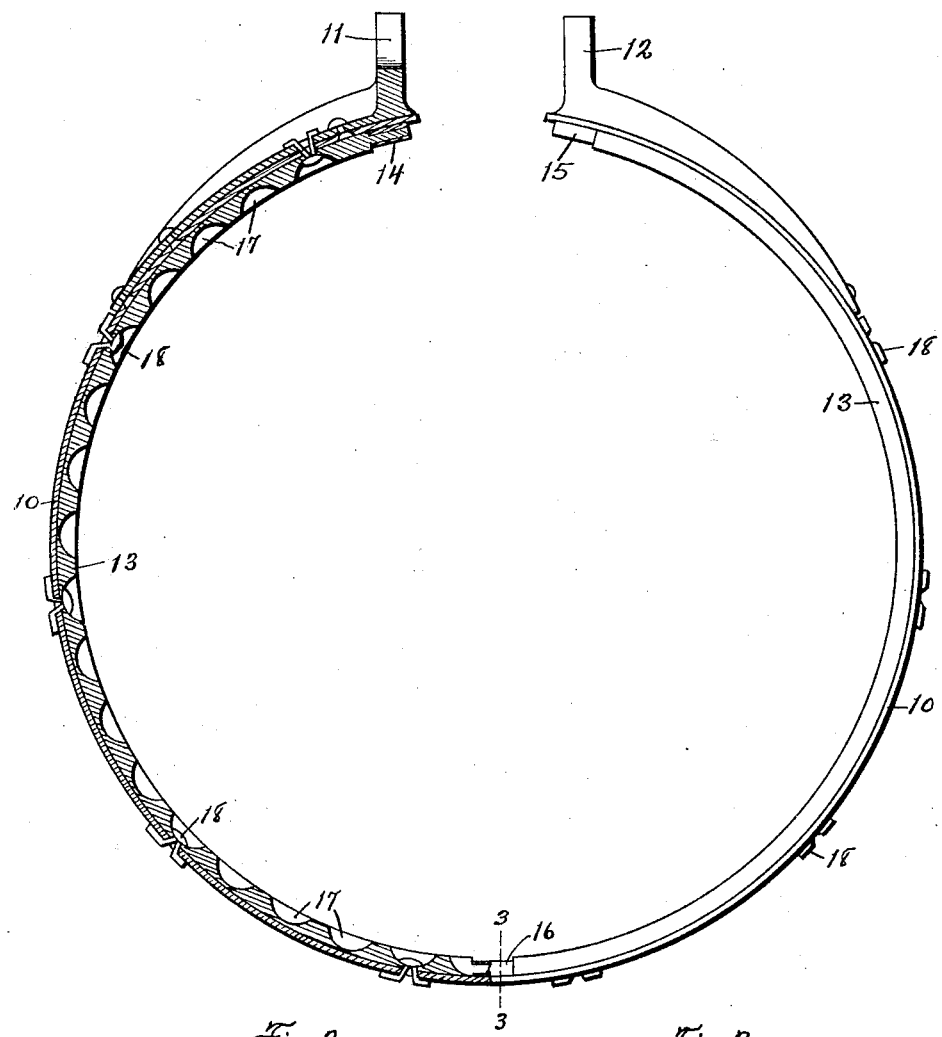
Figure 2:
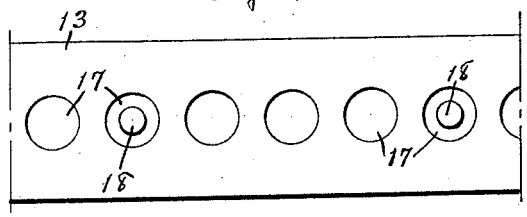
Figure 3:
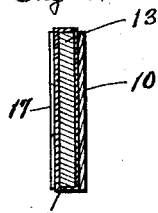

Figure 1 is a side elevation, partly in section, illustrating my improved lining applied to a brake or clutch band. Figure 2 is a face view of a portion of the lining. Figure 3 is a cross-section on the line 3—3 of Figure 1.

In the construction of the device as shown the numeral 10 designates an open metallic band having at its ends outstanding lugs or fingers 11, 12 adapted to be operated by suitable means (not shown) to cause the band to be compressed upon a revolving clutch or brake drum, in a common manner. A lining 13 is mounted on the inner face of the band 10 and said lining, according to my invention, is composed of a strip of wood. The strip comprising the lining 13 is encircled by a number of metallic reinforcing clips or bands 14, 15, 16, in this instance three in number and located respectively at the ends and center of the strip. The clips 14, 15, 16 are inset in the material of which the lining is composed, in such manner that they are countersunk relative to the radially inner face of said lining and cannot come into contact with the driven member when the band 10 is compressed thereon. It is the function of the clips 14, 15, 16 to prevent splitting of the strip of wood of which the lining is composed, and they serve greatly to lengthen the life of the lining. On its inner face the lining 13 is formed with a series of pockets 17 preferably arranged on the median line of the lining and arranged close together throughout the entire length of said lining. The pockets 17 may be of any desired size, shape and number, and in this instance are shown as concaved seats or depressions, of a diameter about one-third the width of the strip or lining. Rivets 18, of any desired number, are employed to secure the lining 13 to the band 10, and the heads of said rivets are located in certain spaced ones of the pockets 17 and have their ends flattened or upset against the outer face of the said band. By placing the rivets in the pockets 17 they are prevented from contacting with the driven member when the band is compressed thereon.

In practical use the driven member runs in a bath of lubricating oil (usually) and as the band 10 is compressed thereon and the lining 13 caused to approach said driven member, the rotation of said member causes oil and air to be drawn from the pockets 17 of the lining, so that said pockets are partial vacuums when the lining is brought into contact with the driven member. This causes a suction gripping effect of the lining upon the driven member which, combined with the superior gripping effect of the wood surface of the lining, effects a sure and positive gripping and holding relation between the brake or clutch band and the driven member. The lining may be composed of any suitable kind of wood which is sufficiently tough and may be bent to fit the metallic band; and when so formed will not burn or char even under the severest strains, provided it is sufficiently lubricated. Thorough and continued experiment has demonstrated that this lining is much more efficient than any of the cork fabric, composition or other brake or clutch linings now in use, and that the gripping relation achieved is such as to cause frictional engagement between the band and driven member without sudden jars or shocks or unpleasant noise, and which has a greater effectiveness than any other lining now known. It also is much more durable than the common forms of lining and will retain its effectiveness for a long period of time under severe conditions of use. This form of lining also, being tenacious, tough, non-frangible and homogeneous in character, is much more effective and long-lived than linings formed of cork or composition which are more or less frangible and crumbly by nature and apt to disintegrate and burn out under severe usage.

The clips may be of any suitable character to supply reinforcement to the wooden lining and prevent splitting thereof.

I claim as my invention—

1. A lining for brakes and clutches, comprising a strip of wood encircled at spaced points by reinforcing clips.

2. A lining for brake and clutch bands composed of a strip of wood formed with pockets in its inner face and also encircled at spaced points by reinforcing clips.

3. A lining for brake and clutch bands formed with a series of pockets on its inner face extending from end to end thereof and relatively close together, said lining being encircled by spaced metallic clips countersunk therein.

4. In a device of the class described, a metallic band and a lining therefor composed of a strip of wood, said strip being encircled by a number of reinforcing clips, said strip also being formed with a series of pockets in its inner face, and rivets extending through and connecting said band and lining, said rivets being located in certain of said pockets whereby they are countersunk relative to the inner face of said lining, said reinforcing clips also being countersunk relative to the inner face of said lining.

Signed at Des Moines, in the county of Polk and State of Iowa, this 29th day of March, 1920.

LEMEUL E. BOOTH.